United States Patent [19]
Flanders et al.

[11] 4,204,944
[45] * May 27, 1980

[54] PROCESS FOR REMOVING POLLUTANTS FROM NONZEOLITIC CATALYST REGENERATOR FLUE GAS

[75] Inventors: Robert L. Flanders, San Anselmo; William A. Blanton, Jr., Woodacre, both of Calif.

[73] Assignee: Chevron Research Company, San Francisco, Calif.

[*] Notice: The portion of the term of this patent subsequent to Jan. 31, 1995, has been disclaimed.

[21] Appl. No.: 923,426

[22] Filed: Jul. 10, 1978

Related U.S. Application Data

[63] Continuation-in-part of Ser. No. 786,724, Apr. 11, 1977, Pat. No. 4,115,251, which is a continuation-in-part of Ser. No. 666,115, Mar. 11, 1976, Pat. No. 4,071,436.

[51] Int. Cl.$^2$ .................. B01J 29/06; C01G 11/04; C01B 17/00
[52] U.S. Cl. .................. 208/120; 208/124; 423/244; 423/563; 252/417; 252/466 R; 252/455 R

[58] Field of Search ............... 423/244 R, 244 H, 563, 423/564; 208/113, 120, 124; 252/455 R, 466 R, 417, 463

[56] References Cited
U.S. PATENT DOCUMENTS

| | | | |
|---|---|---|---|
| 4,071,436 | 1/1978 | Blanton, Jr. et al. | 208/120 |
| 4,115,250 | 9/1978 | Flanders et al. | 208/120 |
| 4,115,251 | 9/1978 | Flanders et al. | 208/120 |

Primary Examiner—Delbert E. Gantz
Assistant Examiner—Gary P. Straub
Attorney, Agent, or Firm—D. A. Newell; R. H. Davies; W. D. Reese

[57] ABSTRACT

Carbon monoxide and sulfur oxides are removed from catalyst regenerator flue gas in an FCC system using a nonzeolitic cracking catalyst and sulfur from the flue gas is shifted to form hydrogen sulfide, which is recovered in the gases removed from the cracking reactor in the system by reacting carbon monoxide in the regenerator flue gas with oxygen in contact with a particulate carbon monoxide combustion promoter, reacting sulfur oxides in the regenerator flue gas with particulate alumina physically mixed with the nonzeolitic catalyst to form a sulfur-containing solid, and forming hydrogen sulfide in the cracking reactor by contacting the sulfur-containing solid with the hydrocarbon feed.

10 Claims, No Drawings

PROCESS FOR REMOVING POLLUTANTS FROM NONZEOLITIC CATALYST REGENERATOR FLUE GAS

CROSS REFERENCE TO RELATED APPLICATION

This application is a continuation-in-part of our copending application Ser. No. 786,724, filed Apr. 11, 1977, now U.S. Pat. No. 4,115,251 which is, in turn, a continuation-in-part of our application Ser. No. 666,115, filed on Mar. 11, 1976 and now U.S. Pat. No. 4,071,436, the teachings of both of which are incorporated herein by specific reference.

BACKGROUND OF THE INVENTION

This invention relates to a method for reducing the amount of carbon monoxide and sulfur oxides in the flue gas produced in a catalyst regenerator in a fluid catalytic cracking system employing a nonzeolitic, silica-containing cracking catalyst.

Modern hydrocarbon catalytic cracking systems use a moving bed or, more usually, a fluidized bed of a particulate catalyst. The cracking catalyst is subjected to a continuous cyclic cracking reaction and catalyst regeneration procedure. In a fluidized catalytic cracking (FCC) system, a stream of hydrocarbon feed is contacted with fluidized catalyst particles in a hydrocarbon cracking zone, or reactor, usually at a temperature of about 800°–1100° F., in the absence of added molecular hydrogen. The reactions of hydrocarbons in the hydrocarbon stream at this temperature result in deposition of carbonaceous coke on the catalyst particles. The resulting fluid products are thereafter separated from the coked catalyst and are withdrawn from the cracking zone. The coked catalyst is then stripped of volatiles and is passed to a catalyst regeneration zone. In the catalyst regenerator, the coked catalyst is contacted with a gas containing a controlled amount of molecular oxygen to burn off a desired portion of the coke from the catalyst and simultaneously to heat the catalyst to a high temperature desired when the catalyst is again contacted with the hydrocarbon stream in the cracking zone. After regeneration, the catalyst is returned to the cracking zone, to further vaporize the hydrocarbons and catalyze hydrocarbon cracking. The flue gas formed by combustion of coke in the catalyst regenerator is separately removed from the regenerator. This flue gas, which may be treated to remove particulates and carbon monoxide from it, is normally passed into the atmosphere. Concern with control of pollutants in flue gas has resulted in a search for improved methods for controlling such pollutants, particularly sulfur oxides and carbon monoxide.

The amount of conversion obtained in an FCC cracking operation is the volume percent of fresh hydrocarbon feed changed to gasoline and lighter products during the conversion step. The end boiling point of gasoline for the purpose of determining conversion is conventionally defined as 430° F. Conversion is often used as a measure of the severity of a commercial FCC operation. At a given set of operating conditions, a more active catalyst gives a greater conversion than does a less active catalyst. The ability to provide higher conversion in a given FCC unit is desirable in that it allows the FCC unit to be operated in a more flexible manner. Feed throughput in the unit can be increased, or alternatively a higher degree of conversion can be maintained with a constant feed throughput rate. Catalyst selectivity is also important. This can be defined as conversion to products boiling in the range 100°–430° F. Selectivity and activity of catalysts are substantially adversely affected by the accumulation of high metals levels resulting from high metals concentrations in the FCC feed hydrocarbons. Accordingly, it may be necessary or desirable to have a quite rapid turnover of catalyst inventory in FCC systems processing high metals-level feeds.

The hydrocarbon feeds processed in commercial FCC units normally contain sulfur, usually termed "feed sulfur". The concentration of sulfur in heavier feeds is usually relatively high, particularly in residual feeds. Such residual feeds cannot always be treated, as by hydroprocessing, to remove such sulfur, and, as cleaner, lower-boiling feeds become scarcer and more expensive, the refining industry is turning more and more toward processing residual feeds high in metals and sulfur. For this reason, it is contemplated that the use in toto or in part of less expensive nonzeolitic cracking catalysts may be desirable in units processing residual feeds. The use of nonzeolitic catalyst would make rapid catalyst turnover economical, and the rapid catalyst turnover would mitigate the adverse effects of metals contamination of the cracking catalyst.

It has been found that about 2–10% or more of the feed sulfur in a hydrocarbon feedstream processed in an FCC system is invariably transferred from the feed to the catalyst particles as a part of the coke formed on the catalyst particles during cracking. Likewise, metals in the feed, e.g., iron, vanadium and nickel are also deposited on the catalyst. The sulfur deposited on the catalyst, herein termed "coke sulfur", is eventually cycled from the conversion zone along with the coked catalyst into the catalyst regenerator. Thus, about 2–10% or more of the sulfur in the hydrocarbon feed is continuously passed from the cracking zone into the catalyst regeneration zone in the coked catalyst. In an FCC catalyst regenerator, sulfur contained in the coke is burned along with the coke carbon and hydrogen, forming gaseous sulfur dioxide and sulfur trioxide, which are conventionally removed from the regenerator in the flue gas.

Most of the feed sulfur does not become coke sulfur in the cracking reactor. Instead, it is converted either to normally gaseous sulfur compounds such as hydrogen sulfide and carbon oxysulfide, or to normally liquid organic sulfur compounds. These organic sulfur compounds are carried along with the vapor products and recovered from the cracking reactor. About 90% or more of the feed sulfur is thus continuously removed from the cracking reactor in the stream of processed, cracked hydrocarbons, with about 40–60% of this sulfur being in the form of hydrogen sulfide. Provisions are conventionally made to recover hydrogen sulfide from the effluent from the cracking reactor. Typically, a very-low-molecular-weight off-gas vapor stream is separated from the $C_3+$ liquid hydrocarbons in a gas recovery unit, and the off-gas is treated, as by scrubbing it with an amine solution, to remove the hydrogen sulfide. Removal of sulfur compounds such as hydrogen sulfide from the fluid effluent from an FCC cracking reactor is relatively simple and inexpensive compared to removal of sulfur oxides from an FCC regenerator flue gas by conventional methods. Moreover, if all the sulfur which must be recovered from an FCC operation could be recovered in a single recovery operation performed on the reactor off-gas, the necessity for two separate sulfur recovery operations in an FCC unit could be obviated.

It has been suggested to diminish the amount of sulfur oxides in FCC regenerator flue gas by desulfurizing a hydrocarbon feed in a separate desulfurization unit prior to cracking or to desulfurize the regenerator flue gas itself, by a conventional flue gas desulfurization procedure, after removal from the FCC regenerator. Clearly, both of the foregoing alternatives require elaborate, extraneous processing operations and entail large capital and utilities expenses. With a shift toward production of low-sulfur fuel oils, the feed desulfurization capacity of a given refiner may have to be shifted away from FCC feed desulfurization, even in cases where such feed desulfuriztion is presently avaiable.

If sulfur normally removed from the FCC unit in the regenerator flue gas as sulfur oxides is instead removed from the cracking reactor as hydrogen sulfide along with the processed cracked hydrocarbons, the sulfur thus shifted to the reactor effluent is then simply a a small addition to the large amount of hydrogen sulfide and organic sulfur already invariably present in the reactor effluent. The small added expense, if any, of removing even as much as 5-15% more hydrogen sulfide from an FCC reactor off-gas by available means is substantially less than the expense of separate feed desulfurization or flue gas desulfurization to reduce the level of sulfur oxides in the regenerator flue gas. Hydrogen sulfide recovery systems used in present commercial FCC units normally have the capacity to remove additional hydrogen sulfide from the reactor off-gas. Present off-gas hydrogen sulfide recovery facilities could normally handle any additional hydrogen sulfide which would be added to the off-gas if the sulfur normally in the regenerator flue gas were substantially all converted to hydrogen sulfide in the FCC reactor off-gas. It is accordingly desirable to direct substantially all feed sulfur into the fluid cracked products removal pathway from the cracking reactor and reduce the amount of sulfur oxides in the regenerator flue gas.

It has been suggested, e.g., in U.S. Pat. No. 3,699,037, to reduce the amount of sulfur oxides in FCC regenerator flue gas by adding particles of Group IIA metal oxides and/or carbonates, such as dolomite, MgO or $CaCO_3$, to the circulating catalyst in an FCC unit. The Group IIA metals react with sulfur oxides in the flue gas to form solid sulfur-containing compounds. The Group IIA metal oxides lack physical strength, and regardless of the size of the particles introduced, they are rapidly reduced to fines by attrition and rapidly pass out of the FCC unit with the catalyst fines. Thus, addition of dolomite and the like Group IIA materials is a continuous, once-through process, and large amounts of material must be employed, in order to reduce the level of flue gas sulfur oxides for any significant period of time.

It has also been suggested, e.g., in U.S. Pat. No. 3,835,031, to reduce the amount of sulfur oxides in an FCC regenerator flue gas by impregnating a Group IIA metal oxide onto a conventional silica-alumina cracking catalyst. The attrition problem encountered when using unsupported Group IIA metals is thereby reduced. However, it has been found that Group IIA metal oxides, such as magnesia, when used as a component of cracking catalysts, have an undesirable effect on the activity and selectivity of the cracking catalysts. The addition of a Group IIA metal to a cracking catalyst results in two particularly noticeable adverse consequences relative to the results obtained in cracking without the presence of the Group IIA metals: (1) the yield of the liquid hydrocarbon fraction is substantially reduced, typically by greater than 1 volume percent of the feed volume; and (2) the octane rating of the gasoline or naphtha fraction (75°–430° F. boiling range) is substantially reduced. Both of the above-noted adverse consequences are seriously detrimental to the economic viability of an FCC cracking operation and even complete removal of sulfur oxides from regenerator flue gas would not entirely compensate for the losses in yield and octane which result from adding Group IIA metals to an FCC catalyst.

Alumina has been a component of many FCC and other cracking catalysts, but primarily in intimate chemical combination with silica. Alumina itself has little or no acidity and is generally considered to be undesirable for use as a cracking catalyst. The art has taught that alumina is not selective, i.e., the cracked hydrocarbon products recovered from an FCC or other cracking unit using an alumina catalyst would not be desired valuable products, but would include, for example, relatively large amounts of $C_2$ and lighter hydrocarbon gases.

The conventional type of FCC catalyst regeneration currently used in most systems is an incomplete combustion mode. In such systems, referred to herein as "standard regeneration" systems, a substantial amount of coke carbon is left on regenerated catalyst passed from the FCC regeneration zone to the cracking zone. Typically, regenerated catalyst contains a substantial amount of coke carbon, i.e., more than 0.2 weight percent carbon, usually about 0.25 to 0.45 weight percent carbon, depending on the excess oxygen and the temperature of the system. The flue gas removed from an FCC regenerator operating in a standard regeneration mode is characterized by a relatively high carbon monoxide/carbon dioxide concentration ratio. The atmosphere in much or all of the regeneration zone is, over-all, a reducing atmosphere because of the presence of substantial amounts of unburned coke carbon and carbon monoxide.

In general, reducing the level of carbon on regenerated catalyst below about 0.2 weight percent has been difficult. Until recently, there has been little incentive to attempt to remove substantially all coke carbon from the catalyst, because regenerator internals were not metallurgically suited to high temperature, oxidative atmospheres, and incremental carbon up to 0.3% has had little effect on the activity and selectivity of either amorphous silica-alumina or zeolitic catalysts. Most of the FCC cracking catalysts now used, however, contain zeolites, or molecular sieves. Zeolite-containing catalysts particularly, but also amorphous catalysts, have been found to have relatively higher activity and selectivity when their coke carbon content after regeneration is relatively low. A stronger incentive has thus arisen for attempting to reduce the coke content of regenerated FCC catalyst to a very low level, e.g., below 0.2 weight percent. The same is true to a lesser degree with nonzeolitic catalysts.

Zeolitic catalysts are generally highly preferred for catalytic cracking of normal feeds, because their activity and selectivity are high. However, zeolitic catalysts are relatively expensive, so that their use in certain cases may not be practical. For example, in FCC cracking of heavy residual feeds which have not been demetallized, the catalyst rapidly becomes contaminated and deactivated by the metals, and must be discarded after a short period of use. Thus, a nonzeolitic catalyst may be preferred for use in such cases because it is much less expensive and the initial high conversion and selectivity of zeolitic catalysts may not be as important as the expense of using a large amount of catalyst to avoid metals effects. In using either zeolitic or nonzeolitic catalysts, however, the problem of sulfur oxides emissions is encountered.

Several methods have been suggested for burning substantially all carbon monoxide to carbon dioxide during FCC catalyst regeneration, to avoid air pollution, recover heat, and prevent afterburning. Among the procedures suggested for use in obtaining complete carbon monoxide combustion in an FCC regenerator have been: (1) increasing the amount of oxygen introduced into the regenerator relative to standard regeneration; and either (2) increasing the average operating temperature in the regenerator or (3) including various carbon monoxide oxidation promoters in the cracking catalyst to promote carbon monoxide burning. Various solutions have also been suggested for the problem of afterburning of carbon monoxide, such as addition of extraneous combustibles or use of water or heat-accepting solids to absorb the heat of combustion of carbon monoxide.

Complete combustion systems using an unusually high temperature in the catalyst regenerator to accomplish complete carbon monoxide combustion are not altogether satisfactory. Some of the heat generated by carbon monoxide combustion is lost in the flue gas, because CO combustion takes place essentially in a dilute catalyst phase in an after-burning mode, and high temperatures can permanently adversely affect the activity and selectivity of the FCC catalyst.

Several types of addition of Group VIII noble metals and other carbon monoxide combustion promoters to FCC systems have been suggested in the art. In U.S. Pat. No. 2,647,860 it is proposed to add 0.1-1 weight percent chromic oxide to an FCC catalyst to promote combustion of carbon monoxide to carbon dioxide and to prevent afterburning. U.S. Pat. No. 3,364,136 proposes to employ particles containing a small pore (3-5 A.) molecular sieve with which is associated a transition metal from Groups IB, IIB, VIB, VIIB and VIII of the Periodic Table, or compounds thereof, such as a sulfide or oxide. Representative metals disclosed include chromium, nickel, iron, molybdenum, cobalt, platinum, palladium, copper and zinc. The metal-loaded, small-pore zeolite may be used in an FCC system in physical mixture with cracking catalysts containing larger-pore zeolites active for cracking, or the small-pore zeolite may be included in the same matrix with zeolites active for cracking. The small-pore, metal-loaded zeolites are supplied for the purpose of increasing the $CO_2/CO$ ratio in the flue gas produced in the FCC regenerator. In U.S. Pat. No. 3,788,977, it is proposed to add uranium or platinum impregnated on an inorganic oxide such as alumina to an FCC system, either in physical mixture with FCC catalyst or incorporated into the same amorphous matrix as a zeolite used for cracking. Uranium or platinum is added for the purpose of producing gasoline fractions having high aromatics contents, and no effect on carbon monoxide combustion when using the additive is discussed in the patent. In U.S. Pat. No. 3,808,121 it is proposed to supply large-size particles of a carbon monoxide combustion promoter in an FCC regenerator. The smaller-size catalyst particles are cycled between the FCC cracking reactor and the catalyst regenerator, while, because of their size, the larger promoter particles remain in the regenerator. Carbon monoxide oxidation promoters such as cobalt, copper, nickel, manganese, copper chromite, etc., impregnated on an inorganic oxide such as alumina are disclosed for use. Belgian patent publication 820,181 and U.S. Pat. Nos. 4,072,600 and 4,064,039 suggest using catalyst particles containing platinum, palladium, iridium, rhodium, osmium, ruthenium or rhenium or mixtures or compounds thereof to promote carbon monoxide oxidation in an FCC catalyst regenerator. An amount between a trace and 100 ppm of the active metal is added to FCC catalyst particles by incorporation during catalyst manufacture or by addition of a compound of the metal to the hydrocarbon feed to an FCC unit using the catalyst. The publication notes that addition of the promoter metal increases coke and hydrogen formation during cracking. The catalyst containing the promoter metal can be used as such or can be added in physical mixture with unpromoted FCC cracking catalyst.

Applicants' employer and/or affiliates thereof purchased quantities of particulate additives from catalyst manufacturers. The additives were sold by the manufacturers for the purpose of introducing the additives into circulation in admixture with FCC catalyst in FCC units to promote combustion of carbon monoxide during catalyst regeneration in the units. Applicants' employer and/or affiliates thereof used the additives in their commercial FCC operations. One such additive was understood to contain a mixture of platinum-alumina particles and silica-alumina particles.

SUMMARY OF THE INVENTION

In a process for cracking hydrocarbons in the absence of added molecular hydrogen wherein a nonzeolitic cracking catalyst including of at least one acidic cracking component from the group consisting of silica-containing nonzeolitic crystalline refractory inorganic oxides and silica-containing amorphous refractory inorganic oxides is cycled between a cracking zone and a catalyst regeneration zone, a sulfur-containing hydrocarbon stream is cracked in contact with said catalyst in said cracking zone, and a sulfur-containing flue gas is formed in said regeneration zone by burning sulfur-containing coke off said nonzeolitic catalyst with an oxygen-containing gas, the method for reducing the amount of carbon monoxide and sulfur oxides in said flue gas which comprises:

(a) reacting carbon monoxide and oxygen to form carbon dioxide in said regeneration zone in contact with a carbon monoxide oxidation promoter comprising a metal or compound of a metal selected from platinum, palladium, iridium, rhodium, osmium, ruthenium and copper;

(b) forming a sulfur- and aluminum-containing solid in said regeneration zone by reacting sulfur trioxide with alumina, said aluming having a surface area of at least 50 square meters per gram and being included in a particulate solid physically admixed with said catalyst, said particulate solid being substantially free from said metal or metal compound; and (c) removing sulfur from said particulate solid and forming hydrogen sulfide in said cracking zone by contacting said sulfur- and aluminum-containing solid with said hydrocarbon stream.

In one more specific embodiment of the method of the invention, the carbon monoxide combustion promoting metal is incorporated into the nonzeolitic cracking catalyst itself, and an alumina-containing particulate is physically mixed with the promoted, nonzeolitic catalyst and the mixture is circulated in a cracking system.

In another more specific embodiment of the method of the invention, the carbon monoxide combustion promoting metal is incorporated in a first particulate solid other than the nonzeolitic catalyst while the alumina for removing sulfur oxides is incorporated in a second particulate solid other than the catalyst with both the first and second particulate solids being circulated in an FCC system physically mixed with the nonzeolitic cracking catalyst particles.

In another embodiment, the present invention relates to a composition of matter comprising a physical mixture of:

(1) a particulate nonzeolitic cracking catalyst for cracking hydrocarbons in the absence of added molecular hydrogen, said catalyst including at least one acidic cracking component from the group consisting of silica-containing nonzeolitic crystalline inorganic oxides and silica-containing amorphous inorganic oxides;

(2) a first particulate solid comprising an inorganic oxide associated with 0.01 to 2 weight percent platinum or a platinum compound, calculated as the metal, said first particulate solid being in admixture with said nonzeolitic catalyst in an amount sufficient to provide 0.01 to 100 parts per million, by weight, of platinum, with respect to said catalyst; and (3) a second particulate solid comprising at least 60 weight percent alumina, said second particulate solid being substantially free from platinum, said alumina having a surface area of at least 50 square meters per gram, and said second particulate solid being in admixture with said catalyst in an amount sufficient to provide 0.1 to 25 weight percent alumina, with respect to said nonzeolitic catalyst.

We have found that the use of a particulate carbon monoxide combustion promoter containing a metal or metal compound very active for CO combustion promotion in conjunction with the use of particulate alumina for reaction with sulfur oxides in regenerator flue gas provides a synergistic method for removing both carbon monoxide and sulfur oxides from the regenerator flue gas. By proceeding according to a preferred embodiment of the method of the invention, it is possible to add exactly the desired amount of CO combustion promoter to burn the exactly desired amount of carbon monoxide in the flue gas, and likewise to add exactly the desired amount of alumina reactant to provide a titrated amount of sulfur oxides removal from the regenerator flue gas. Advantages of adding the separate promoter particles and alumina reactant particles include the ability to change the mode of operation in relation to carbon monoxide combustion or to sulfur oxides removal without recourse to changing the whole catalyst inventory of a catalytic cracking unit.

We have found that by employing a complete combustion system in a process using a nonzeolitic cracking catalyst (e.g., for cracking metals containing residual feeds) in connection with using alumina to remove sulfur oxides from the regenerator flue gas, that the level of sulfur oxides can be substantially reduced while the use of the inexpensive nonzeolitic catalyst permits rapid turnover (replacement) of catalyst to overcome the adverse effects of metals contamination. Thus, the use of a CO combustion promoter with a nonzeolitic catalyst provides a surprising improvement in the FCC operation using a nonzeolitic catalyst.

DETAILED DESCRIPTION OF THE INVENTION

The present invention is used in connection with a fluid catalyst cracking process for cracking hydrocarbon feeds. The same sulfur-containing hydrocarbon feed normally processed in commercial FCC systems may be processed in a cracking system employing the present invention. Suitable feedstocks include, for example, gas oils, light cycle oils, heavy cycle oils, etc., which usually contain about 0.1–10 weight percent sulfur. Sulfur may be present in the feed as a thiophene, disulfide, thioether, etc. Suitable feedstocks normally boil in the range from about 400°–1100° F. or higher. A suitable feed may include recycled hydrocarbons which have already been cracked. Atmospheric and vacuum residual fractions are particularly suitable and preferred materials for use in feeds processed according to the present invention, especially heavy feeds containing relatively high concentrations of contaminant metals.

The cracking catalyst employed may be a conventional particulate, nonzeolitic cracking catalyst including silica, and preferably including alumina. The catalyst used in the present process contains at least one active, acidic cracking component selected from the group consisting of silica-containing, nonzeolitic, crystalline, refractory inorganic oxides and silica-containing, amorphous, refractory inorganic oxides. The acidic component must include at least 10 weight percent silica and preferably includes at least 20 weight percent silica. Examples of suitable acidic crystalline materials are natural and synthetic clays, acid-treated clays and the like. Examples of suitable amorphous materials are amorphous, natural or synthetic silica-alumina, silica-magnesia, silica-alumina-magnesia, silica-zirconia, etc. Acidic, nonzeolitic, refractory inorganic oxides containing silica and alumina are preferred. Examples of suitable materials include kaolin clays, silica-containing gels and cogels, etc. Refractory inorganic oxides may include one or more of alumina, magnesia, zirconia, thoria, titania and the like. Those skilled in the art will be familiar with a large number of suitable nonzeolitic catalysts, in that such catalysts were the predominant type used in FCC operations prior to introduction of zeolitic catalysts.

Zeolitic cracking catalysts are those containing a crystalline aluminosilicate zeolite as an active, acidic cracking component. Crystalline aluminosilicate zeolites have a regular, three-dimensional crystal structure defining pores, channels and/or cells having molecular dimensions. They are commonly referred to as molecular sieves. Zeolitic catalyst are very highly acidic, and have a substantially higher cracking activity than, for example, amorphous silica-alumina catalysts. The acidity and activity of a cracking catalyst can be measured by any of several tests known to those skilled in the art. Activity tests are described or referenced in U.S. Pat. Nos. 4,010,116, 3,957,689, 3,976,598, 3,816,342 and 3,048,536, the complete disclosures of which are incorporated herein by specific reference.

Cracking conditions employed in the cracking or conversion step in an FCC system are frequently provided in part by pre-heating or heat-exchanging hydrocarbon feeds to bring them to a temperature of about 600°–750° F. before introducing them into the cracking zone; however, pre-heating of the feed is not essential.

Cracking conditions include a catalyst/hydrocarbon weight ratio of about 3-10. A hydrocarbon weight space velocity in the cracking zone of about 2-50 per hour is preferably used. The average amount of coke contained in the catalyst after contact with the hydrocarbons in the cracking zone, when the catalyst is passed to the regenerator, is preferably between about 0.5 weight percent and about 2.5 weight percent, depending in part on the carbon content of regenerated catalyst in the particular system, as well as the heat balance of the particular system.

The catalyst regeneration zone used in an FCC system employing an embodiment of the present invention must be capable of operation with a sustained oxidative atmosphere. The gaseous atmosphere inside the regeneration zone is normally comprised of a mixture of gases in concentrations which vary according to the locus within the regenerator. The concentrations of gases also vary according to the coke concentration on catalyst particles entering the regenerator and according to the amount of molecular oxygen and steam passed into the regenerator. Generally, the gaseous atmosphere in a regenerator contains 5-25% steam, varying amounts of oxygen, carbon monoxide, nitrogen, carbon dioxide, sulfur dioxide, and sulfur trioxide. In order to facilitate removal of sulfur contents from the regenerator flue gas within the regenerator according to the invention, it is preferred that relatively coke-free particles containing active alumina must contact the gaseous regenerator atmosphere at a locus at which the atmosphere contains sulfur trioxide or molecular oxygen and sulfur dioxide. In regenerators of conventional design, the flue gas includes the desired components and catalyst normally contacts the flue gas at this point, after having been freed of a substantial amount of coke. When regenerators of this type are employed, contact between relatively coke-free alumina-containing particles and the oxygen and sulfur dioxide or sulfur trioxide is facilitated.

According to one aspect of the invention, a carbon monoxide combustion promoter is employed in an FCC system. The carbon monoxide combustion promoters which are suitable for use according to the invention are the metals platinum, palladium, iridium, rhodium, osmium, ruthenium and copper, or compounds thereof, such as the oxides, sulfides, sulfates, etc. At least one of the foregoing metals or metal compounds is used, and mixtures of two or more of the metals are also suitable. For example, mixtures of platinum and palladium or copper are suitable. The effect of the above-mentioned carbon monoxide combustion promoter metals may be enhanced by combining them with small amounts of other metals or metalloids, particularly rhenium, tin, germanium or lead.

The carbon monoxide combustion promoter is employed in the FCC system in one or both of two ways: (1) the promoter is incorporated, preferably at a very small concentration, into the nonzeolitic FCC catalyst or into a substantial portion (e.g., more than 10%) of the nonzeolitic FCC catalyst, as by impregnation, ion exchange, etc.; or, more preferably, (2) the promoter is present in the system in association with a relatively small amount of a particulate solid other than the nonzeolitic catalyst, e.g., particles of a refractory inorganic oxide such as alumina, silica, or the like, suitable for circulation in an FCC system, or the promoter is present in an insubstantial portion (e.g., less than 5% and preferably less than 1%) of the nonzeolitic FCC catalyst particles, with the promoter metal thus being present in physical mixture with all or substantially all of the FCC catalyst. When used in the preferred physical mixture with the nonzeolitic FCC catalyst, the promoter metal is preferably present in a particulate solid in a relatively high concentration. However, the over-all concentration of the promoter with respect to the total catalyst inventory in circulation is comparable to the amount used when the promoter is added to the nonzeolitic catalyst itself.

Irrespective of whether the promoter employed is incorporated in the FCC catalyst or is incorporated in a separate particulate solid physically circulated with the catalyst, the total amount of promoter metal added to the system is preferably sufficient to promote combustion of most or substantially all of the carbon monoxide produced in an FCC regenerator.

Platinum is a particularly preferred promoter for use in the present method. The total amount of platinum added to an FCC system, if the platinum is present on the catalyst itself, is preferably between about 0.05 and 20 ppm (weight), with respect to the total amount of circulating, nonzeolitic catalyst inventory in the system. In the preferred case in which the platinum is present on only a small fraction of particles in the system, i.e., when the platinum is located on the particulate solid physically admixed with the nonzeolitic FCC catalyst, it is preferred that the total amount of platinum added to an FCC system be between about 0.01 and 100 parts per million, by weight, with an amount between about 0.1 and 10 parts per million being particularly preferred, with respect to the total amount of catalyst inventory circulating in the system. It will be apparent that the amount of platinum present in a given discrete particle added to an FCC system will be greater when fewer particles containing the promoter are added. The concentration of platinum in a given particle can range up to 2 weight percent, or higher, if desired, in cases where a very small number of particulate, platinum-containing material is added to an FCC system. Preferably, however, the amount of platinum added to a particulate solid is kept at less than 1 weight percent of the total weight of the solid. An amount of platinum added to discrete solids of about 0.01 to 1 weight percent of the total weight of the discrete solids is a preferred range for use.

The amount of Group VIII noble metals other than platinum is generally between about 2 times to 10 times higher total concentration in the system, with respect to the total amount of catalyst, than is used when a platinum promoter is employed. Thus, the amount of the Group VIII metal such as palladium, iridium, etc., can be calculated from the foregoing description of the concentration of a platinum promoter, at least twice as much and preferably 5 times as much of other Group VIII noble metals is used. The concentration of the other Group VIII noble metals on any discrete particle in the FCC system is usually kept below about 2 weight percent, and preferably below about 1 weight percent.

The amount of copper used in an FCC system as a promoter is generally about 100 to about 5000 times higher total concentration in the system, with respect to the total amount of catalyst used, than the amount of platinum which would be used in the same system. The concentration of copper promoter on any discrete particle is usually kept below about 20 weight percent, and preferably below about 10 weight percent.

The promoter metal, or metal compound, can be added to the nonzeolitic FCC catalyst itself. It is, however, preferred to add the promoter metal to the FCC system in a form which is associated with a discrete particulate solid, which is circulated in physical admixture with the nonzeolitic FCC catalyst in the system. The particulate solid to be mixed with the catalyst particles can be any material which is suitable for circulation in an FCC system in particulate form in admixture with the catalyst. Particularly suitable materials are the porous, refractory inorganic oxides, such as alumina and silica, or mixtures of two or more inorganic oxides, such as silica-alumina, natural and synthetic clays and the like, crystalline aluminosilicate zeolites, etc. Gamma alumina is particularly good. The promoter metal can be added to a particulate solid in any suitable manner, as by impregnation or ion exchange, or can be added to a precursor of a particulate solid, as by coprecipitation from an aqueous solution with an inorganic oxide precursor sol. The particulate solid can be formed into particles of a size suitable for use in an FCC system by conventional means, such as spray-drying, crushing of larger particles to the desired size, etc.

A particulate solid which contains at least one promoter metal or metal compound of the type described above can be admixed with the bulk of the nonzeolitic FCC catalyst prior to charging the catalyst to an FCC unit. Likewise, the particulate solid containing a promoter can be added to an FCC unit separately from the nonzeolitic catalyst in the desired amount.

When the promoter metal is employed in the system, and particularly when the promoter metal is present in a relatively high concentration in a particulate solid physically admixed with the nonzeolitic cracking catalyst, it is preferred to perform at least a major portion of the combustion of all carbon monoxide in the catalyst regenerator in a dense catalyst phase region within the regenerator. By a dense catalyst phase region, is meant that the catalyst density in the region is at least 10 pounds per cubic foot.

Particularly when using a separate particulate promoter physically mixed with the nonzeolitic cracking catalyst, it is also preferred to introduce sufficient oxygen into the regeneration zone in an FCC system so that a minimum molecular oxygen content of 0.5 volume percent, and preferably at least 1.0 volume percent, is maintained in the atmosphere in the regeneration zone.

Particularly when using a separate particulate promoter physically mixed with the nonzeolitic cracking catalyst, it is also preferred to burn a sufficient amount of coke off the nonzeolitic catalyst in the regeneration zone so that the average concentration of carbon in regenerated catalyst cycled from the regeneration zone to the cracking zone is below 0.2 weight percent.

Further according to the invention, sulfur oxides are removed from the flue gas in an FCC regeneration zone by reacting sulfur trioxide with alumina in the regeneration zone. The alumina used for the reaction has a surface area of at least 50 m²/g, e.g., gamma- or eta-alumina. Suitable alumina is not in intimate combination with more than 40 weight percent silica, and preferably is substantially free from admixture with silica. Alumina from any particular source is suitable for use in the present method if it contains an average of about 0.1 to 100 weight percent of "reactive alumina", as determined by treating particles containing the alumina by the following steps:

(1) passing a stream of a gas mixture containing, by volume, 10% water, 1% hydrogen sulfide, 10% hydrogen and 79% nitrogen over the solid particle continuously at a temperature of 1200° F. and atmospheric pressure until the weight of the solid particle is substantially constant;

(2) passing a stream of a gas mixture containing, by volume, 10% water, 15% carbon dioxide, 2% oxygen and 73% nitrogen over the solid particle resulting from step (1) at a temperature of 1200° F. and atmospheric pressure until the weight of the solid particle is substantially constant, the weight of the particle at this time being designated "Wa"; and (3) passing a stream of a gas mixture containing, by volume, 0.05% sulfur dioxide, and, in addition, the same gases in the same proportions as used in step (2), over the solid particle resulting from step (2) at a temperature of 1200° F. and atmospheric pressure until the weight of the solid particle is substantially constant, the weight of the solid particle at this time being designated "Ws".

The weight fraction of reactive alumina in the solid particle, designated "Xa", is determined by the formula $$Xa = \frac{Ws - Wa}{Wa} \times \frac{\text{Molecular Wt. Alumina}}{3 \times \text{Molecular Wt. Sulfur Trioxide}}$$

The alumina used is included in a particulate solid suitable for circulation in an FCC system. Suitable particles normally must have an alumina content of at least 60 weight percent and, preferably, the alumina content of the particles is 90 weight percent or more.

In a preferred embodiment, particles of gamma-alumina are used. Alumina can be formed into particles of suitable size for circulation with FCC catalyst in an FCC system by spray-drying, crushing larger particles, etc.

The alumina is added to an FCC system and circulated in physical mixture with the nonzeolitic FCC catalyst. The amount of alumina added is preferably more than 0.1 weight percent and less than 25 weight percent of the total amount of nonzeolitic catalyst inventory circulating in the FCC system. The addition of an amount of alumina between 1.0 and 15 weight percent of the total nonzeolitic catalyst inventory is particularly preferred. The size, shape and density of the alumina-containing particles used in the process is preferably regulated to provide particles which circulate in substantially the same manner as the catalyst particles.

The added alumina reacts with sulfur trioxide or sulfur dioxide and oxygen in the FCC catalyst regenerator to form at least one solid compound including sulfur and aluminum, such as a sulfate of aluminum. In this way, sulfur oxides are removed from the regenerator atmosphere and are not removed from the regenerator in the flue gas.

Particles containing the solid aluminum- and sulfur-containing material are circulated from the regenerator to the cracking zone in the FCC system along with the nonzeolitic FCC catalyst. In the cracking zone, alumina is regenerated and hydrogen sulfide is formed by contacting the sulfur-containing solid with the stream of hydrocarbon being treated in the cracker. In addition to forming hydrogen sulfide, the reaction between the sulfur- and aluminum-containing solid and the hydrocarbon feed may produce some other fluid sulfur compounds such as carbonoxysulfide, organic sulfides, etc. The resulting vapor sulfur compounds exit the cracking zone as a part of the stream of cracked hydrocarbons, along with the fluid sulfur compounds formed directly from sulfur in the hydrocarbon feed. Off-gas subsequently separated from the cracked hydrocarbon stream thus includes hydrogen sulfide formed directly from the feed sulfur and hydrogen sulfide formed by reaction of the sulfur- and aluminum-containing solid with the hydrocarbon stream in the cracking zone.

It is essential to operation of the present invention that the particles which contain alumina to be reacted with sulfur trioxide in the regenerator must be substantially free from any of the promoter metals or metal compounds described above for use in carbon monoxide and coke combustion promotion, that is, platinum, palladium, iridium, rhodium, osmium, ruthenium and copper. It has been found that the presence of these combustion-promoting metals or compounds thereof in particles which contain alumina to be used for reaction with sulfur oxides is actually detrimental to the capacity of the alumina in the particles to form solid sulfur-containing materials in an FCC regenerator. Thus, when these promoter metals are present on particles containing alumina to be reacted with sulfur trioxide, the desired reaction of the sulfur trioxide to form a solid is impaired, and larger amounts of sulfur oxides exit the FCC regenerator in the regenerator flue gas, contrary to the object of the invention. Thus, the metal promoters disclosed, although essential to operation of the invention, must be used in a particulate solid other than the alumina-containing particles, which are circulated in physical mixture with the alumina which is to be reacted with sulfur oxides. The promoter metals may, thus, be on (1) the FCC catalyst, or, preferably (2) on separate particles circulated in the FCC system with the FCC catalyst and with the sulfur oxides controlling alumina particles.

Further according to the invention, a composition of matter is provided for use according to the method of the invention described above. In a broad aspect, the composition includes a physical mixture of: (1) a particulate nonzeolitic cracking catalyst for cracking hydrocarbons in the absence of added molecular hydrogen and including at least one acidic cracking component from the group consisting of silica-containing nonzeolitic crystalline refractory inorganic oxides and silica-containing amorphous refractory inorganic oxides; (2) a first particulate solid other than the nonzeolitic catalyst containing a promoter metal; and (3) a second particulate solid other than the nonzeolitic catalyst free from the promoter metal and containing at least 60 weight percent alumina. Preferably, the composition includes a physical mixture of three components. First, the composition includes a particulate, nonzeolitic, acidic cracking catalyst. Second, the composition includes a first particulate solid other than the catalyst comprising an inorganic oxide such as alumina or silica-alumina associated with 0.01 to 2 weight percent platinum or a platinum compound, wherein the amount of platinum is calculated on the basis of the elemental metal. The first particulate solid is in admixture with the nonzeolitic cracking catalyst in an amount sufficient to provide a total of 0.01 to 100 parts per million, by weight, of platinum, with respect to the weight amount of catalyst in the composition. Third, the composition includes a second particulate solid other than the nonzeolitic catalyst comprising at least 60 weight percent, and preferably at least 90 weight percent, alumina. The second particulate solid is substantially free from platinum. The second solid is included in admixture with the nonzeolitic cracking catalyst in an amount sufficient to provide a total of 0.1 to 25 weight percent alumina in the composition with respect to the weight amount of catalyst in the composition.

The composition mixture according to the invention can be formed by mixing the three components and the mixture can be employed by charging it to a catalytic cracking system in the same manner in which cracking catalyst is normally charged to the system. Alternatively, the composition can be formed in a catalytic cracking system by separately charging each of the components, or one of the components, to an FCC system and forming the mixture of the three components within the FCC system.

The following illustrative embodiment describes a preferred embodiment of the operation of the present invention.

ILLUSTRATIVE EMBODIMENT

A conventional FCC system and equilibrium amorphous, acidic silica-alumina, cracking catalyst of a commercially available type are employed for cracking about 19,000 barrels per day of a feed including 10 volume percent of a highly metals-contaminated residual hydrocarbon stock. The feed contains about 1.0 weight percent feed sulfur. The cracking zone used contains a combination of riser cracking and dense-bed cracking modes. Cracking conditions employed include a reactor temperature of about 920° F., a hydrocarbon weight hourly space velocity of about 5 per hour and a conversion rate (defined as percent of feed converted to 430° F. and lighter components) of about 65%. The average amount of coke on spent catalyst is about 0.95 weight percent. The coke on spent catalyst includes about 1.0 weight percent sulfur. The amount of carbon on regenerated catalyst is about 0.4 weight percent. The flue gas exiting the catalyst regenerator includes about 700 parts per million (volume) sulfur oxides (calculated as sulfur dioxide), about 0.3 volume percent oxygen, and has a $CO/CO_2$ ratio of about 1.0. Catalyst regeneration conditions used in the regeneration zone include a temperature of about 1200° F. Catalyst is circulated continuously between the cracking zone and regeneration zone at the rate of about 15 tons per minute, with a total catalyst inventory in the system of about 180 tons.

According to the invention, a particulate solid consisting essentially of gamma alumina is added to the inventory of nonzeolitic catalyst in circulation in the unit in an amount sufficient to provide 10 weight percent alumina, with respect to the total weight of nonzeolitic catalyst in circulation in the system. The alumina employed is a commercially available type which which has been spray-dried to provide particles of the same size and fluidizable properties as the catalyst. The alumina employed has a surface area of about 180 $m^2/g$. After the circulation of alumina is equilibrated, the amount of sulfur oxides, calculated as sulfur dioxide, in the flue gas exiting the catalyst regenerator is again measured and is found to be less than 500 parts per million (volume). Alumina is thereafter continuously added to the unit to retain about 10 weight percent alumina in admixture with the nonzeolitic FCC catalyst, to replenish any alumina lost by normal attrition.

Further according to the invention, 60 pounds of particles comprising 0.6 weight percent platinum impregnated on an alumina carrier are introduced into circulation in the FCC unit along with the nonzeolitic catalyst and alumina particles. Introduction of the platinum-alumina particles is then continued at the rate of about 7 pounds per day. The amount of platinum added to the system is thereby maintained at an equilibrium level of about 1 part per million, by weight, with respect to the total amount of nonzeolitic catalyst in the system. Most of the carbon monoxide is burned in a dense catalyst phase region in the regenerator. A sufficient amount of oxygen is added to the regenerator to provide at least 0.5 volume percent oxygen at all locations in the regenerator atmosphere. After addition of both the alumina-sulfur oxides reactant particles and the platinum-alumina carbon monoxide combustion promoter particles, the $CO/CO_2$ ratio and sulfur oxides level in the flue gas exiting the regeneration zone are measured. The $CO/CO_2$ ratio is found to be substantially reduced to below 0.005, while the sulfur oxides level, calculated as $SO_2$, is found to have further decreased to below 100 parts per million (volume).

As can be seen from the foregoing illustrative embodiment, the method of the present invention provides a simple and economical method for controlling both the amount of carbon monoxide and the amount of sulfur oxides present in flue gas removed from an FCC catalyst regenerator in a system using a nonzeolitic cracking catalyst. A large number of variations, modifications and equivalents of the embodiment illustrated will be apparent to those skilled in the art and are intended to be included within the scope of the appended claims.

What is claimed is:

1. In a process for cracking hydrocarbons in the absence of added molecular hydrogen wherein a nonzeolitic cracking catalyst including of at least one acidic cracking component from the group consisting of silica-containing nonzeolitic crystalline refractory inorganic oxides and silica-containing amorphous refractory inorganic oxides is cycled between a cracking zone and a catalyst regeneration zone, a sulfur-containing hydrocarbon stream is cracked in contact with said catalyst in said cracking zone, and a sulfur-containing flue gas is formed in said regeneration zone by burning sulfur-containing coke off said nonzeolitic catalyst with an oxygen-containing gas, the method for reducing the amount of carbon monoxide and sulfur oxides in said flue gas which comprises:
   (a) reacting carbon monoxide and oxygen to form carbon dioxide in said regeneration zone in contact with a carbon monoxide oxidation promoter comprising a metal or compound of a metal selected from platinum, palladium, iridium, rhodium, osmium, ruthenium and copper;
   (b) forming a sulfur- and aluminum-containing solid in said regeneration zone by reacting sulfur trioxide with alumina, said alumina having a surface area of at least 50 square meters per gram and being included in a particulate solid physically admixed with said catalyst, said particulate solid being substantially free from said metal or metal compound; and
   (c) removing sulfur from said particulate solid and forming hydrogen sulfide in said cracking zone by contacting said sulfur- and aluminum-containing solid with said hydrocarbon stream.

2. In a process for cracking hydrocarbons in the absence of added molecular hydrogen wherein a nonzeolitic cracking catalyst including of at least one acidic cracking component from the group consisting of silica-containing nonzeolitic crystalline refractory inorganic oxides and silica-containing amorphous refractory inorganic oxides is cycled between a cracking zone and a catalyst regeneration zone, a sulfur-containing hydrocarbon stream is cracked in contact with said catalyst in said cracking zone, and a sulfur-containing flue gas is formed in said regeneration zone by burning sulfur-containing coke off said nonzeolitic catalyst with an oxygen-containing gas, the method for reducing the amount of carbon monoxide and sulfur oxides in said flue gas which comprises:
   (a) including in said nonzeolitic catalyst a carbon monoxide oxidation promoter comprising at least one metal, or compound of a metal, selected from platinum, palladium, iridium, rhodium, osmium, ruthenium and copper, and reacting carbon monoxide and oxygen to form carbon dioxide in said regeneration zone in contact with said promoter;
   (b) forming a sulfur- and aluminum-containing solid in said regeneration zone by reacting sulfur trioxide with alumina, said alumina having a surface area of at least 50 square meters per gram and being included in a particulate solid physically admixed with said nonzeolitic catalyst, said particulate solid being substantially free from said metal or metal compound; and
   (c) removing sulfur from said reactant and forming hydrogen sulfide in said cracking zone by contacting said sulfur- and aluminum-containing solid with said hydrocarbon stream.

3. A method according to claim 2 wherein a sufficient amount of said particulate solid is admixed with said nonzeolitic catalyst to provide between 0.1 and 25 weight percent alumina, with respect to said catalyst.

4. A method according to claim 2 wherein said metal is platinum.

5. A method according to claim 3 wherein said nonzeolitic catalyst includes between 0.01 and 100 parts per million, by weight, of platinum, calculated as the elemental metal.

6. In a process for cracking hydrocarbons in the absence of added molecular hydrogen wherein a nonzeolitic cracking catalyst including of at least one acidic cracking component from the group consisting of silica-containing nonzeolitic crystalline refractory inorganic oxides and silica-containing amorphous refractory inorganic oxides is cycled between a cracking zone and a catalyst regeneration zone, a sulfur-containing hydrocarbon stream is cracked in contact with said catalyst in said cracking zone, and a sulfur-containing flue gas is formed in said regeneration zone by burning sulfur-containing coke off said nonzeolitic catalyst with an oxygen-containing gas, the method for reducing the amount of carbon monoxide and sulfur oxides in said flue gas which comprises:
   (a) reacting carbon monoxide and oxygen to form carbon dioxide in said regeneration zone in contact with a carbon monoxide oxidation promoter comprising a metal or compound of a metal selected from platinum, palladium, iridium, rhodium, osmium, ruthenium and copper, said promoter being associated with a first particulate solid other than said nonzeolitic, said first particulate solid being physically admixed with said nonzeolitic catalyst;
   (b) forming a sulfur- and aluminum-containing solid in said regeneration zone by reacting sulfur trioxide with alumina, said alumina having a surface area of at least 50 square meters per gram and being included in a second particulate solid being substantially free from said promoter metal or metal compound; and (c) removing sulfur from said second particulate solid and forming hydrogen sulfide in said cracking zone by contacting said sulfur- and aluminum-containing solid with said hydrocarbon stream.

7. A method according to claim 6 wherein a sufficient amount of said second particulate solid is admixed with said catalyst to provide between 0.1 and 25 weight percent alumina, with respect to said catalyst.

8. A method according to claim 6 wherein said metal is platinum and a sufficient amount of said first particulate solid is admixed with said nonzeolitic catalyst to provide between 0.01 and 100 parts per million of platinum, by weight, calculated as the elemental metal, with respect to said catalyst.

9. A method according to claim 6 wherein said carbon monoxide oxidation promoter includes 0.01 to 20 weight percent of said metal, calculated as the elemental metal.

10. A composition of matter comprising a physical mixture of:

(1) a particulate nonzeolitic cracking catalyst for cracking hydrocarbons in the absence of added molecular hydrogen, said catalyst including at least one acidic cracking component from the group consisting of silica-containing nonzeolitic crystalline inorganic oxides and silica-containing amorphous inorganic oxides;

(2) a first particulate solid comprising an inorganic oxide associated with 0.01 to 2 weight percent platinum or a platinum compound, calculated as the metal, said first particulate solid being in admixture with said nonzeolitic catalyst in an amount sufficient to provide 0.01 to 100 parts per million, by weight, of platinum, with respect to said catalyst; and (3) a second particulate solid comprising at least 60 weight percent alumina, said second particulate solid being substantially free from platinum, said alumina having a surface area of at least 50 square meters per gram, and said second particulate solid being in admixture with said catalyst in an amount sufficient to provide 0.1 to 25 weight percent alumina, with respect to said nonzeolitic catalyst.

* * * * *